(12) United States Patent
Lindholm

(10) Patent No.: US 11,731,726 B2
(45) Date of Patent: Aug. 22, 2023

(54) METHOD OF CONVERTING A TWO-WHEEL MOTORCYCLE TO A THREE-WHEEL MOTORCYCLE WITH REDUCED TRAIL DISTANCE

(71) Applicant: Trike Shop of Minnesota, Inc., Gem Lake, MN (US)

(72) Inventor: Douglas A. Lindholm, Lake Elmo, MN (US)

(73) Assignee: TRIKE SHOP OF MINNESOTA, INC., Gem Lake, MN (US)

( * ) Notice: Subject to any disclaimer, the term of this patent is extended or adjusted under 35 U.S.C. 154(b) by 201 days.

(21) Appl. No.: 17/221,078

(22) Filed: Apr. 2, 2021

(65) Prior Publication Data

US 2021/0229773 A1 Jul. 29, 2021

Related U.S. Application Data

(63) Continuation of application No. 16/176,080, filed on Oct. 31, 2018, now abandoned.

(60) Provisional application No. 62/579,602, filed on Oct. 31, 2017.

(51) Int. Cl.
| | |
|---|---|
| *B62K 21/02* | (2006.01) |
| *B62K 11/02* | (2006.01) |
| *B62K 25/02* | (2006.01) |
| *B62K 5/027* | (2013.01) |
| *B62K 25/16* | (2006.01) |

(52) U.S. Cl.
CPC ............. *B62K 21/02* (2013.01); *B62K 5/027* (2013.01); *B62K 11/02* (2013.01); *B62K 25/02* (2013.01); *B62K 25/16* (2013.01); *B62K 2201/04* (2013.01)

(58) Field of Classification Search
CPC ........ B62K 5/027; B62K 11/02; B62K 21/02; B62K 25/02; B62K 25/16; B62K 2201/04
USPC ......................................................... 280/275
See application file for complete search history.

(56) References Cited

U.S. PATENT DOCUMENTS

| | | |
|---|---|---|
| D278,044 S | 3/1985 | Ohba |
| 4,662,645 A | 5/1987 | McMurtrey |
| D295,844 S | 5/1988 | Levine |
| D317,736 S | 6/1991 | Kastan |
| D340,434 S | 10/1993 | Hammer et al. |
| D344,253 S | 2/1994 | Bishop et al. |
| D368,054 S | 3/1996 | Behrens et al. |
| D372,214 S | 7/1996 | Vaillancourt |
| 5,692,577 A * | 12/1997 | Dornbusch ............ B62K 13/04 280/124.152 |
| D401,537 S | 11/1998 | Turner |

(Continued)

OTHER PUBLICATIONS

Prosecution history from corresponding U.S. Appl. No. 16/176,080, filed Oct. 31, 2018 including a Non-Final rejection dated Nov. 2, 2020.

*Primary Examiner* — Kevin Hurley
*Assistant Examiner* — Felicia L. Brittman
(74) *Attorney, Agent, or Firm* — Peter J. Ims; Westman, Champlin & Koehler, P.A.

(57) ABSTRACT

A front fork for a motorcycle includes a bottom portion configured to engage an axle of a front wheel, the bottom portion having a center line at an angle relative to vertical. An angled middle portion extends from a top of the bottom portion at an angle relative to vertical that is larger than the bottom portion center line angle relative to vertical. A steering head attachment extends from a top of the angled middle portion.

17 Claims, 7 Drawing Sheets

(56) References Cited

U.S. PATENT DOCUMENTS

| | | |
|---|---|---|
| D411,147 S | 6/1999 | Tsai |
| D414,141 S | 9/1999 | Tsai |
| D415,449 S | 10/1999 | Tsai |
| D427,947 S | 7/2000 | Carpinelli et al. |
| 6,352,276 B1 | 3/2002 | Hill |
| D464,003 S | 10/2002 | Chen |
| D470,440 S | 2/2003 | Rose et al. |
| 6,517,095 B1 | 2/2003 | Lansac et al. |
| D494,108 S | 8/2004 | Liao |
| D506,708 S | 6/2005 | Conte |
| 6,916,033 B2 | 7/2005 | Yih |
| D514,477 S | 2/2006 | Doll |
| D521,420 S | 5/2006 | Cobb |
| D542,718 S | 5/2007 | Costa |
| 7,591,474 B1 | 9/2009 | French |
| 7,819,216 B1 * | 10/2010 | Johnson ............... B62K 27/003 180/209 |
| D675,132 S | 1/2013 | Colp |
| D774,986 S | 12/2016 | Salvioli Mariani et al. |
| 9,598,137 B2 | 3/2017 | Tsai et al. |
| 9,688,344 B2 | 6/2017 | Rae |
| 9,981,713 B2 | 5/2018 | Tsai |
| D860,061 S | 9/2019 | Weagle et al. |
| D902,086 S | 11/2020 | Tan |
| D912,582 S | 3/2021 | Lindholm |
| 2004/0026890 A1 | 2/2004 | Cobb |
| 2007/0257466 A1 | 11/2007 | Murphy et al. |
| 2011/0316249 A1 | 12/2011 | Thoma |
| 2015/0274250 A1 | 10/2015 | Kuwabara et al. |
| 2019/0127012 A1 | 5/2019 | Lindholm |

\* cited by examiner

METHOD OF CONVERTING A TWO-WHEEL MOTORCYCLE TO A THREE-WHEEL MOTORCYCLE WITH REDUCED TRAIL DISTANCE

CROSS REFERENCE TO RELATED DISCLOSURE

The present application is a continuation of U.S. patent application Ser. No. 16/176,080, filed Oct. 31, 2018; which is based on and claims the benefit of U.S. provisional patent application Ser. No. 62/579,602, filed Oct. 31, 2017, the content of which is hereby incorporated by reference in their entirety.

BACKGROUND

Many motorcycles are modified from a two wheel motorcycle to a three wheel motorized cycle. The motorized three wheel motorized cycle has two back wheels attached to a drive train and a single front wheel used to steer the motorcycle.

While at a two wheel motorcycle utilizes both turning of the front wheel and leaning the motorcycle into the turn, a three wheel motorcycle utilized little to no leaning because the two back wheels prevent such movement. As such, a distance from where the front wheel touches the ground to where the steering axis intersects the ground (commonly referred to as trail) can be reduced to increase the responsiveness of the motorcycle to the steering of the front wheel.

SUMMARY

A front fork for a motorcycle includes a bottom portion configured to engage an axle of a front wheel, the bottom portion having a center line at an angle relative to vertical. An angled middle portion extends from a top of the bottom portion at an angle relative to vertical that is larger than the bottom portion center line angle relative to vertical. A steering head attachment extends from a top of the angled middle portion.

A steering assembly for a front wheel of a motorcycle includes a front fork, a steering head secured to the angled upper portion, wherein the steering head has an axis of rotation that is substantially parallel with the center line of the bottom portion, and a suspension secured to the steering head and a main body of the motorcycle. The front fork includes a bottom portion configured to engage an axle of a front wheel, the bottom portion having a center line at an angle relative to vertical, and an angled upper portion extending from the bottom portion wherein the front fork reduces a trail distance relative to a substantially straight front fork.

A method of improving steering response of a three wheel motorcycle includes reducing trail distance of the motorcycle with a front steering assembly. Reducing trail distance includes displacing an axis of a front fork of the motorcycle from a steering axis of a steering head of the motorcycle. The axis of the front fork is displaced forward of the steering axis using the fork having a lower portion and an upper portion, and an angled portion coupling the upper and lower portions. The axis of the steering assembly is substantially parallel to the steering axis.

A three wheel motorcycle of the present disclosure includes a dual rear wheel set and a front wheel, an engine and a drive train, and a steering assembly for the front wheel of the motorcycle. The steering assembly includes a front fork having a bottom portion configured to engage an axle of a front wheel, the bottom portion having a center line at an angle relative to vertical, and an angled upper portion extending from the bottom portion wherein the front fork reduces a trail distance relative to a substantially straight front fork. A steering head is secured to the angled upper portion, wherein the steering head has an axis of rotation that is substantially parallel with the center line of the bottom portion, a suspension is secured to the steering head and a main body of the motorcycle

DETAILED DESCRIPTION

Figure 1:
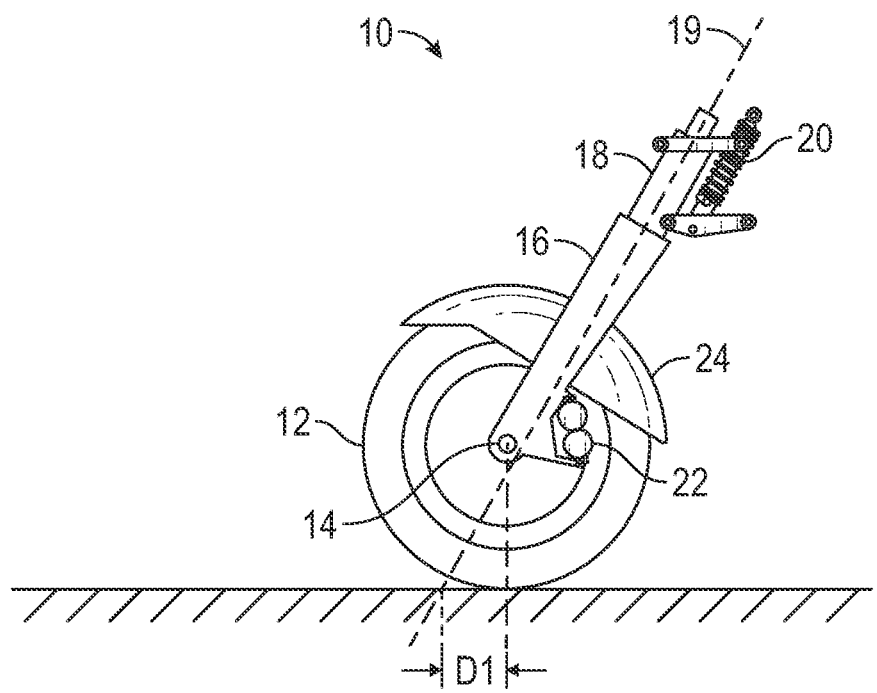
FIG. 1 is a schematic diagram of a front fork/steering head assembly for a motorcycle.

A schematic diagram of a typical front wheel and steering mechanism for a two-wheel motorcycle, such as a Honda Goldwing, is illustrated at 10 in FIG. 1. A typical front wheel steering mechanism 10 includes a wheel 12 supported by an axle 14 that is attached to a front fork 16. A steering head 18 is non-rotatably secured to the front fork 16 and carries a handlebar configured to be gripped and manipulated by a driver to steer the motorcycle by rotating the steering head about an axis of rotation 19. A suspension 20, such as a compression spring attaches the front fork 16 to a frame of the motorcycle (where the frame is not illustrated).

The front fork 16 carries caliper 22 of a front brake where the caliper 22 is configured to frictionally engage a disk. In some motorcycles, the front fork 16 also carries a front fender 24 that is positioned about the front wheel 12 where the front fender 22 substantially prevents road spray from splattering on the driver. As such, the front fork 16 not only supports the wheel 12 but also provides a support surface for numerous other parts of the motorcycle, including but not limited to the caliper 22, the fender 24 and a front head light (not shown).

As mentioned above, the trail distance D1 or the distance between where the front wheel 12 touches the ground and where the steering axis 19 intersects the ground is designed to be used in combination with leaning the motorcycle when turning or steering. However, when a two-wheel motorcycle is converted to a three-wheel motorcycle with two back wheels, the ability to utilize lean to steer the motorcycle is substantially eliminated. To compensate for the loss of lean, the front fork is modified to reduce the trail, and thereby increase the responsiveness of the steering.

Figure 2:
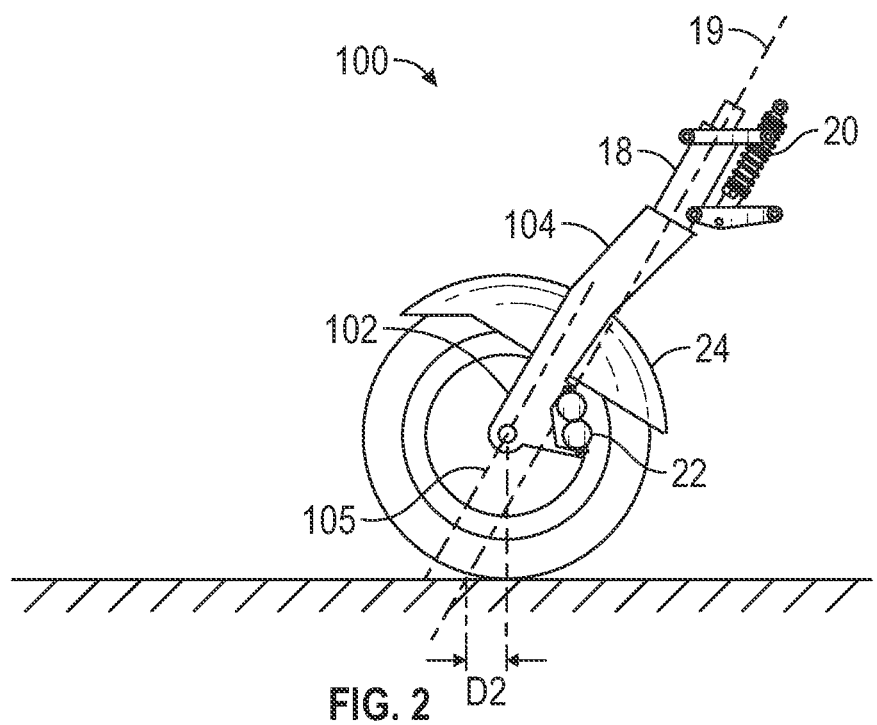
FIG. 2 is a schematic diagram of a front fork of an embodiment of the present disclosure with a steering head assembly for a motorcycle.

A front fork of the present disclosure is illustrated at 100 in FIG. 2. The front fork 100 includes a bottom portion 102 and an angled top portion 104. The angled portion 104 accepts the steering head 18 such that the axis of rotation 19 remains substantially the same relative to the mechanism 10. However, the angled portion 104 causes the wheel 12 to be positioned a further distance from the main body of the motorcycle such that the trail distance D2 is decreased relative to the trail distance D1. The decrease in the trail distance D2 results in a more responsive steering to compensate for the lack of lean steering when utilizing a three wheel motorcycle.

The bottom portion 104 has a centerline 105 that is substantially parallel to the axis of rotation 19. Having the centerline 105 substantially parallel to the axis of rotation 19 allows the fender 24 and the caliper 22 to be mounted at substantially at the same angle relative to the earth as illustrated in FIG. 1. Therefore, the front wheel 12 will have substantially the same appearance in FIG. 2 with the reduced trail distance D2 as seen in FIG. 1 with the larger trail distance D1.

Further because the axis of rotation 19 is at substantially the same angle and substantially in the same location, the same suspension 20 can be utilized to mount the front fork 100 to the main body. As such, the front fork 100 of the present disclosure can be mounted to the main body without any substantial modifications.

Figure 3:
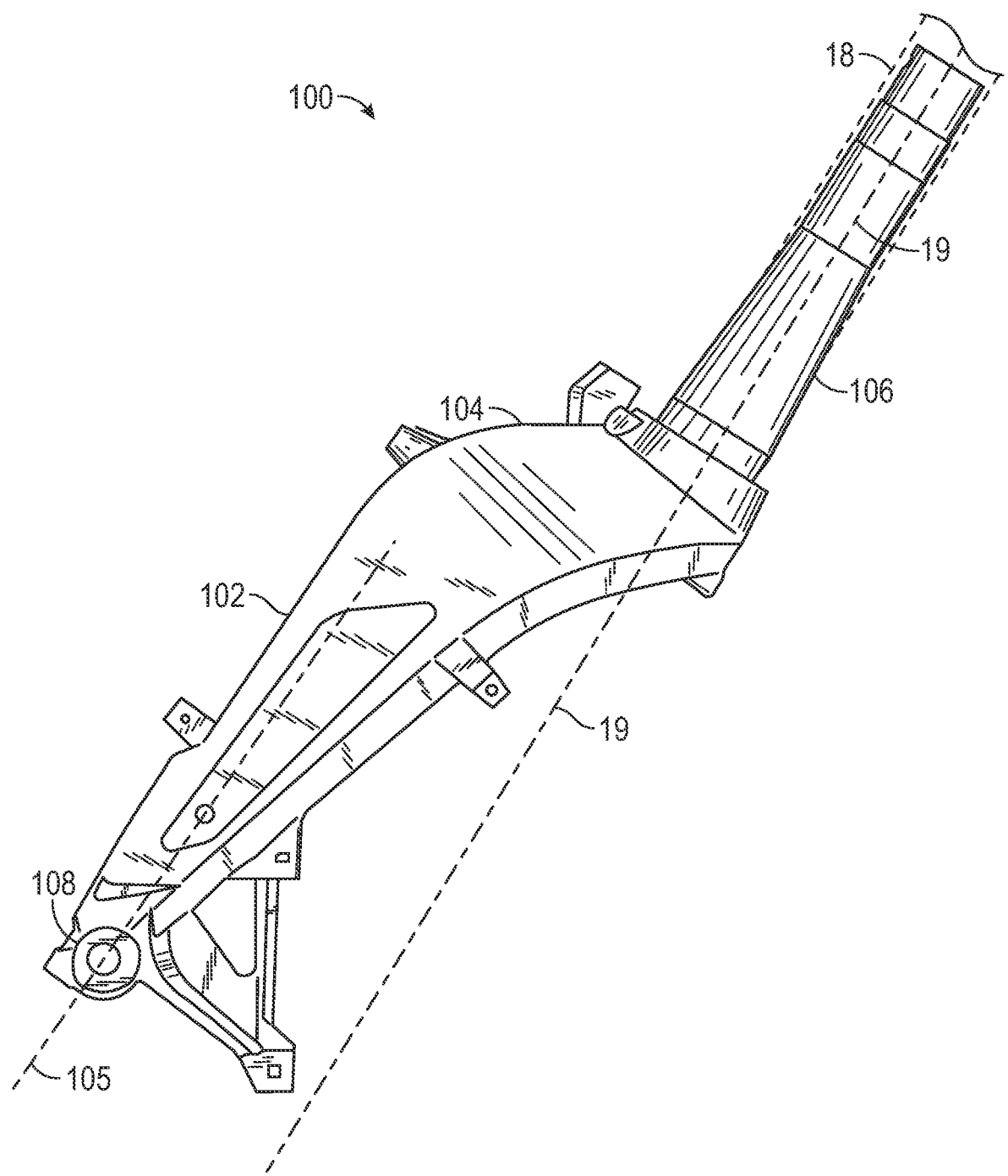
FIG. 3 is a side elevation view of a front fork according to an embodiment of the present disclosure.

FIG. 3 is a more detailed view of a fork according to an embodiment of the present disclosure. As shown, fork 100 comprises lower portion 102 aligned with fork axis 105, and angled portion 104 that is angled relative to lower portion 102 and steering head attachment 106 that aligns with steering axis 19 of a motorcycle. Steering head attachment 106 and lower portion 102 are aligned so that their respective axes, steering axis 19 and fork axis 105 respectively, are substantially parallel. As the axle of a wheel is coupled to the fork 100 at axle opening 108, the fork axis passes through an axle of the wheel of the motorcycle. This fork axis is positioned forward of the steering axis 19 with respect to a front of the motorcycle. The fork 100 displaces the axle of a front wheel of the motorcycle forward, reducing the trail distance by making the axle closer to the pivot point of the steering head.

Steering head attachment 106 extends at the angle of the steering head of a motorcycle, so that the steering head attachment 106 and the axis 105 of the fork lower portion 102 are substantially parallel. In this configuration, the steering axis 19 of the motorcycle, the steering head attachment 106, and the steering head 18 are aligned. The fork lower portion 102 axis 105 is substantially parallel to and in front of the steering head attachment axis, relative to the front of the motorcycle. The fork portions comprise in one embodiment a single solid fork. It should be understood that the fork may be assembled from multiple pieces without departing from the scope of the disclosure.

Figure 4:
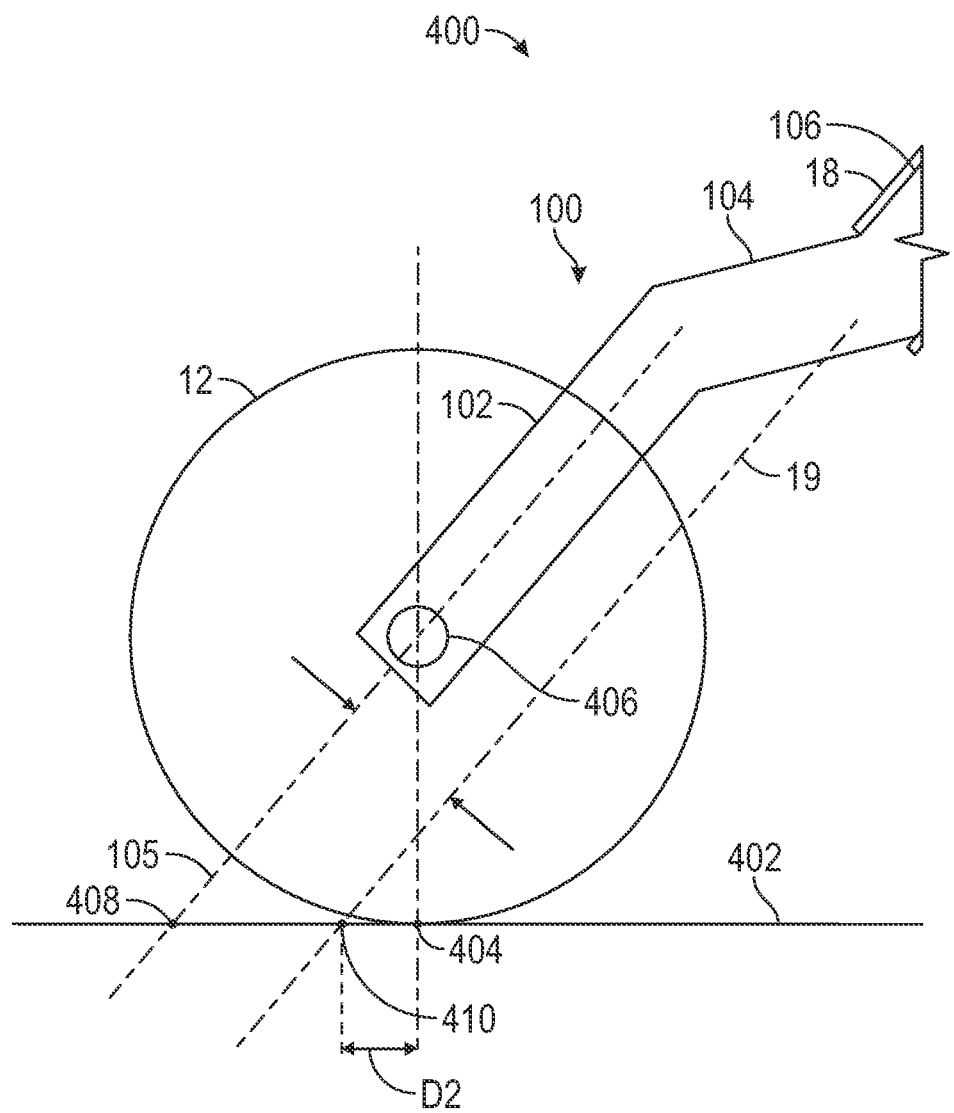
FIG. 4 is a side schematic view of a front fork according to an embodiment of the present disclosure and a wheel, showing trail distance and steering and fork axes.

FIG. 4 shows a portion of a motorcycle 400 on which fork 100 is used to mount wheel 12. Motorcycle wheel 12 contacts the ground 402 at point 404. This contact point is substantially directly vertically below a centerline of an axle 406 of wheel 12. Fork 100 is coupled to wheel 12 at axle 406, and is coupled to steering head 18 at steering head attachment 106. Lower portion 102 of fork 100 has a fork axis 105 that extends through the axle.

Figure 5:
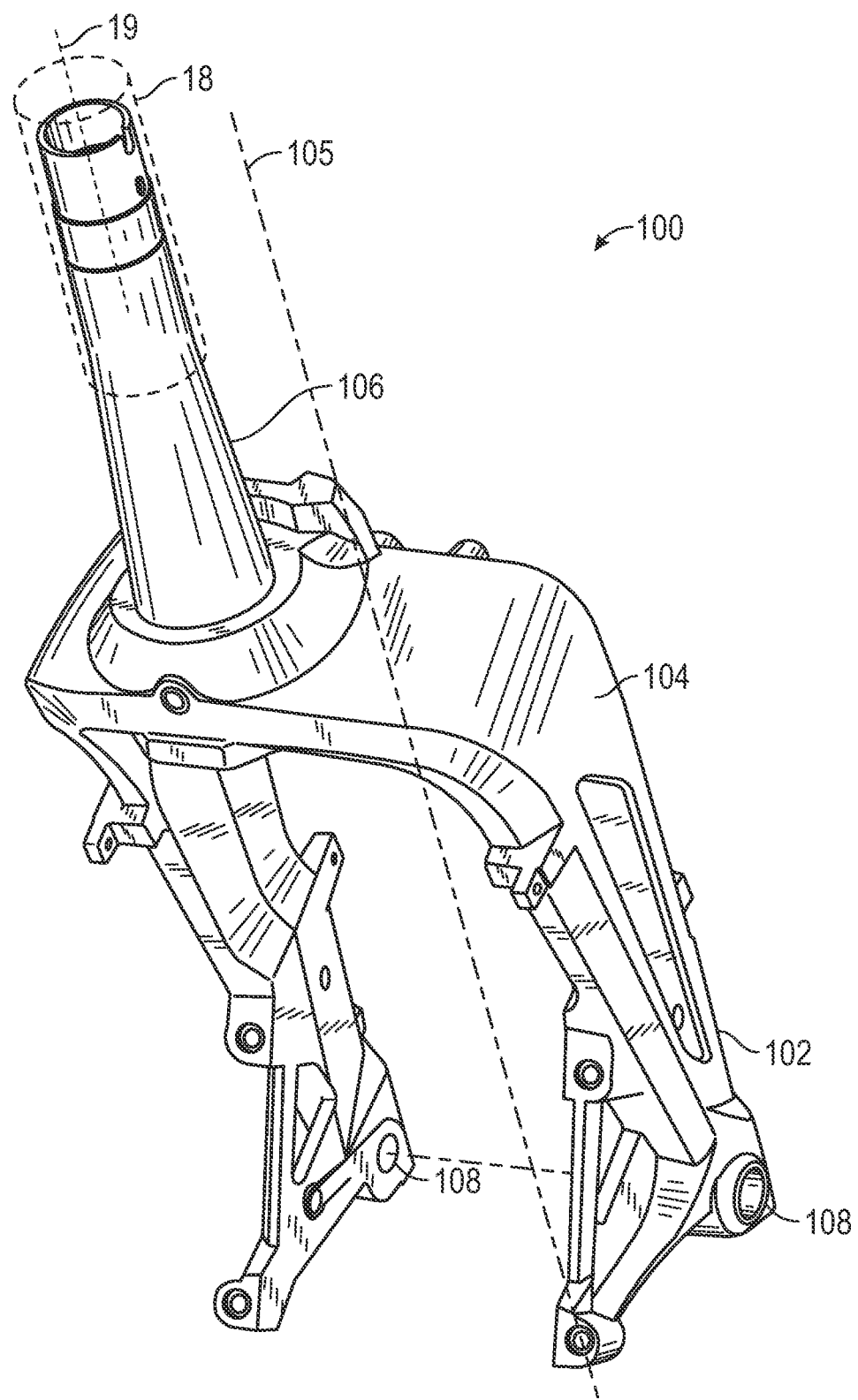
FIG. 5 is a perspective view of the front fork of FIG. 3.

The angled portion 104 of fork 100 extends the fork axis 105 forward from the steering axis 19 of the steering assembly of the motorcycle 400. Accordingly, the trail distance D2 for the fork 100 on motorcycle 400 is reduced from a traditional fork 16. Specifically, the angled portion of the fork 100 moves the fork axis 105 forward from the traditional steering axis 19, but does so in a way that the steering orientation of the motorcycle 400 is maintained. A turning operation of the handlebars of the motorcycle 400 with fork 100 is more sensitive than a turning operation of the handlebars of a motorcycle using a traditional fork. At the same time, the steering operation is consistent with traditional steering because the axis 105 of the fork 100 and the steering axis 19 are substantially parallel. FIG. 5 is a perspective view of the fork 100 shown in FIG. 3.

The rake of a motorcycle is the angle of the steering axis to a vertical line perpendicular to the ground, often drawn through the axle of the wheel. In general, as rake increases so does trail. However, the rake of a motorcycle using the fork embodiments of the present disclosure does not change, since the steering axis and the fork axis are substantially parallel. Fork embodiments of the present disclosure reduce trail distance, without reducing rake. Reduction in trail distance improves steering and steering response, traditionally with a corresponding loss in stability. However, reducing trail distance for a three wheel motorcycle does not have the same potential negative effect of reducing trail in a two-wheel motorcycle, since three road contact points inherently increases stability. With a motorcycle having three points of road contact, a reduced trail distance improves steering without decreasing stability. The embodiments of the present disclosure provide a fork with increased steering ability due to the reduced trail distance.

An increased rake typically increases steering effort and trail distance while also increasing stability. Fork embodiments of the present disclosure do not increase rake, while at the same time decreasing trail distance. With a three wheel motorcycle, stability is much less of an issue that with a two wheel motorcycle, so the increased wheel base and reduced trail distance due to the offset of the fork axis 105 of lower portion 102 of the fork 100 from the steering head attachment 106 and the steering axis 19 do not negatively affect stability of a three wheel motorcycle. The fork embodiments of the present disclosure also aid in turning, as they do not increase rake and they do decrease trail distance.

Figure 6:
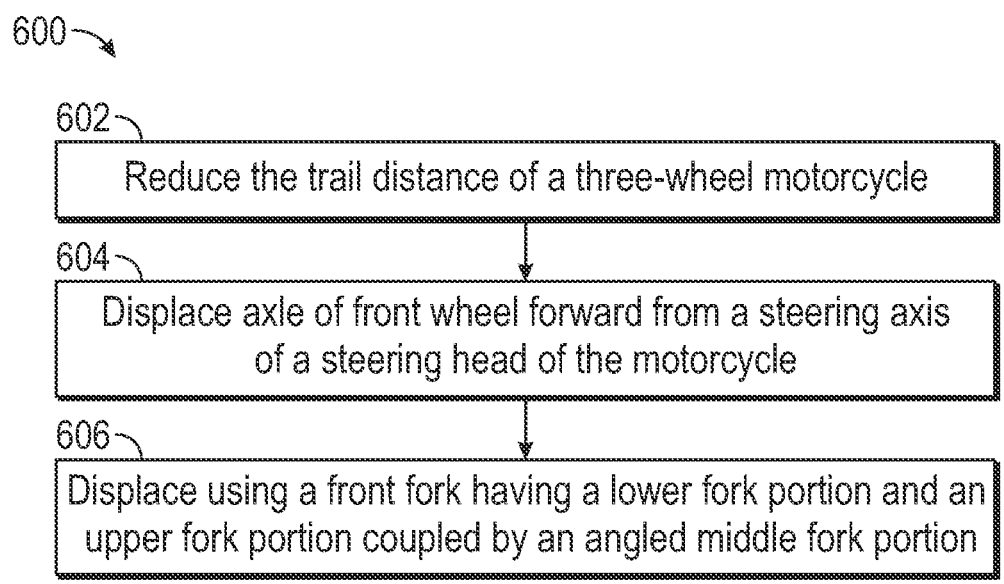
FIG. 6 is a flow chart diagram of a method according to an embodiment of the present disclosure.

FIG. 6 illustrates a method 600 according to an embodiment of the present disclosure. Method 600 for improving steering response of a three wheel motorcycle comprises reducing the trail distance of a three-wheel motorcycle in block 602. Reducing trail distance in one embodiment comprises displacing an axle of a front wheel of the motorcycle forward from a steering axis of a steering head of the motorcycle in block 604. The axle is displaced forward using an axis of a front fork that is displaced forward of the steering axis using a lower fork portion and an upper fork portion coupled by an angled fork middle portion therebetween in block 606. The axis of the steering assembly is substantially parallel to the steering axis.

Figure 7:
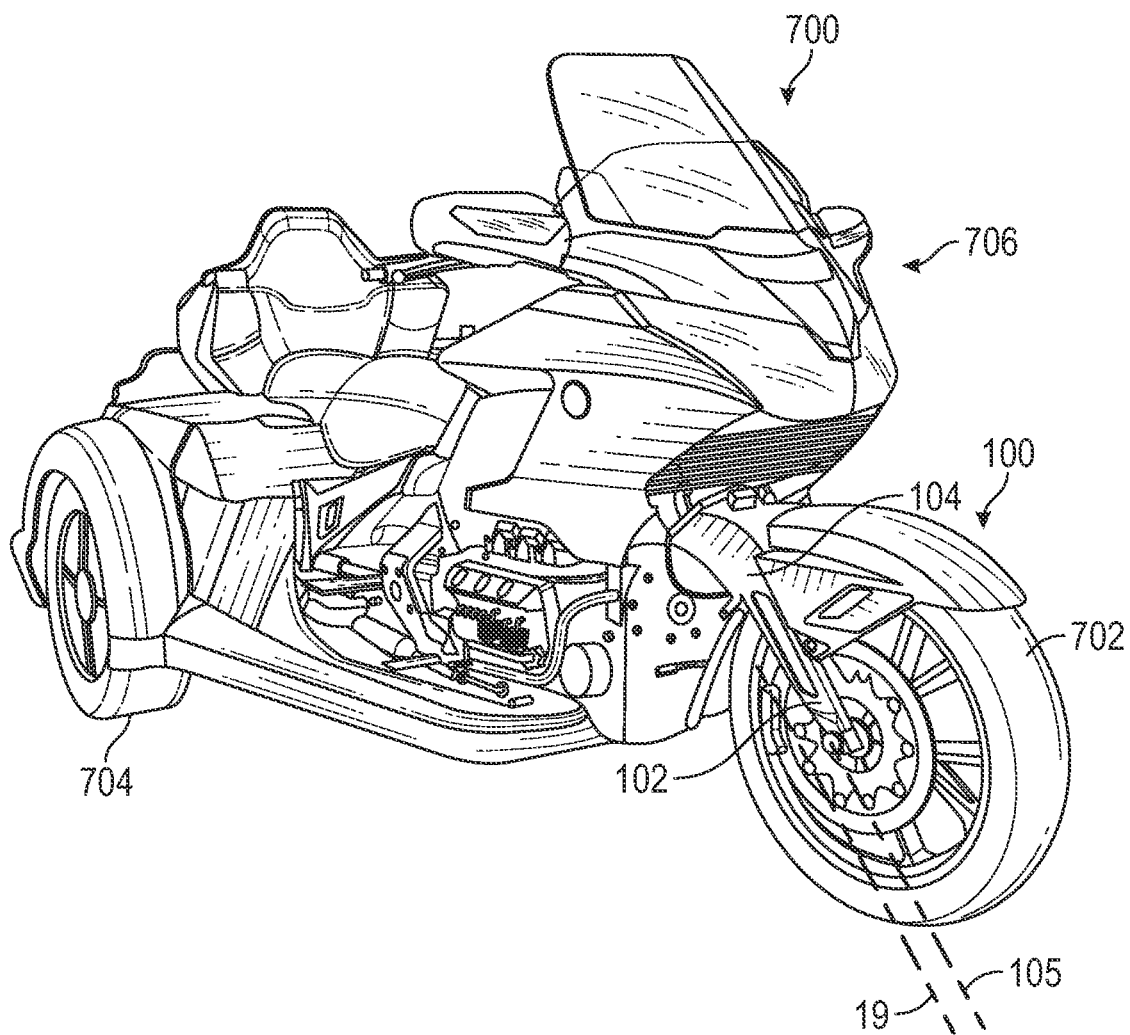
FIG. 7 is a perspective view of a three wheel motorcycle embodiment of the present disclosure.
Figure 8:
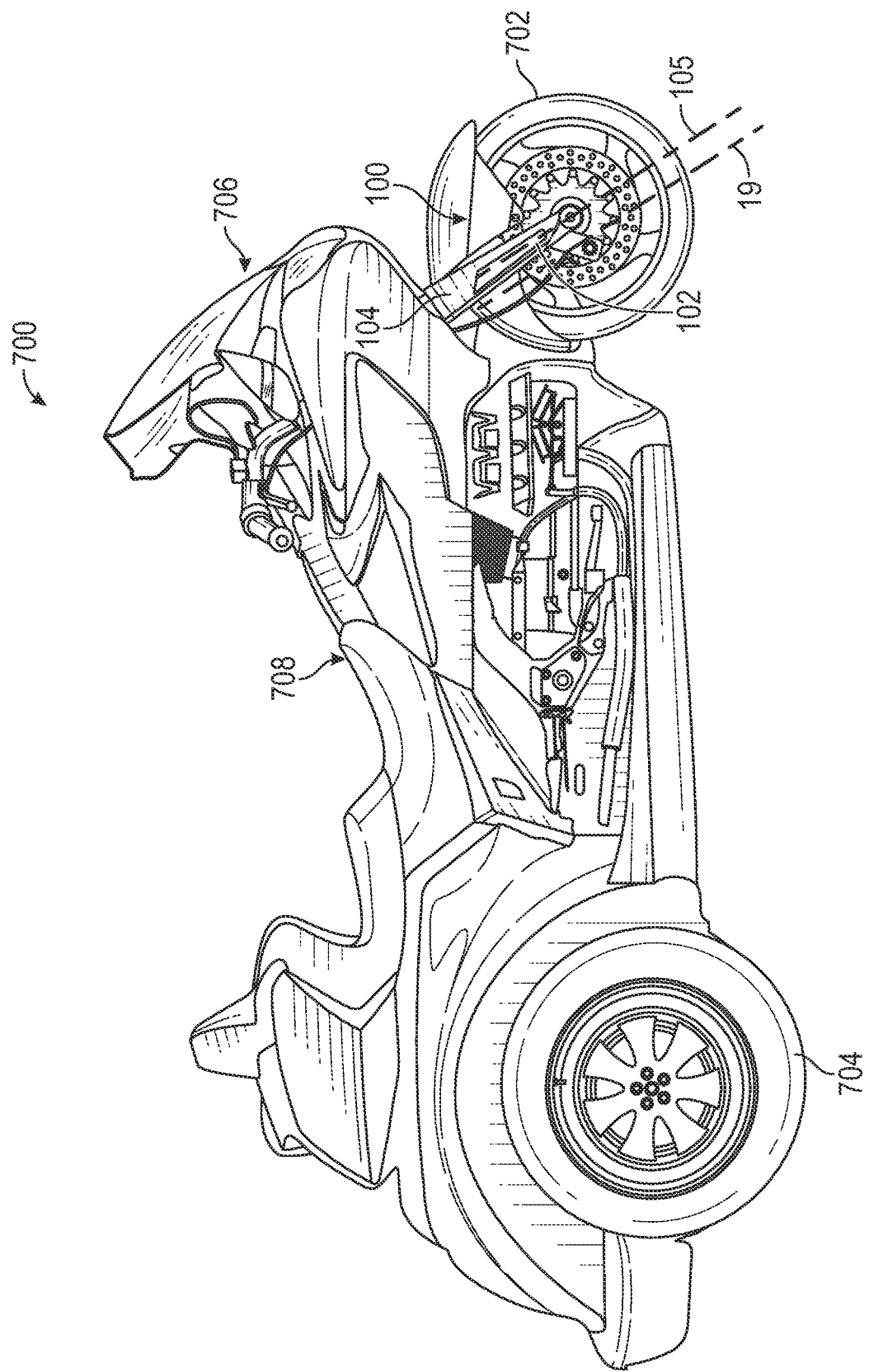
FIG. 8 is a side elevation view of the three wheel motorcycle embodiment of FIG. 7.

FIGS. 7-8 show a motorized cycle 700 with three wheels including front wheel 702 employing fork 100, and dual rear wheels 704, according to an embodiment of the present disclosure. Cycle 700 is in one embodiment a modified motorcycle with added dual read wheels 704 and a front wheel 702 mounted using a fork embodiment of the present disclosure such as fork 100.

In one embodiment, motorcycle 700 is a three wheel motorcycle, comprising a dual rear wheel set 704 and a front wheel 702, and an engine and a drive train. A steering assembly 706 for the front wheel 702 of the motorcycle 700 comprises a front fork 100. Front fork 100 comprises a bottom portion 102 configured to engage an axle of the front wheel 702, the bottom portion 102 having a center line 105 at an angle relative to vertical. An angled upper portion 104 extends from the bottom portion 102 wherein the front fork 100 reduces a trail distance relative to a substantially straight front fork. A steering head 18 is secured to a steering head portion (106, not shown in FIGS. 7-8) of the upper section 104. The steering head 18 has an axis of rotation 19 that is substantially parallel with the center line of the bottom portion 105. A suspension 20 is secured to the steering head 18 and a main body/frame 708 of the motorcycle.

While a fork has been described that includes two straight portions and an angle portion coupling the two straight portions, it should be understood that other configurations may be employed without departing from the scope of the disclosure.

Although the present disclosure has been described with reference to preferred embodiments, workers skilled in the art will recognize that changes may be made in form and detail without departing from the scope of the disclosure.

What is claimed is:

1. A method of converting a two-wheel motorcycle to a three-wheel motorcycle, the method comprising:
   providing the two-wheel motorcycle;
   replacing a single rear drive wheel located along a midplane of the two-wheel motorcycle with two spaced apart drive wheels each located substantially a same distance from the midplane;
   removing a first fork configured to carry a front wheel from the motorcycle, wherein the first fork has a steering axis and wherein when the front wheel is mounted to the first fork, the front wheel has a first trail distance; and
   installing a second fork with a bottom portion and an angled top portion, wherein the steering axis remains substantially the same relative to the first fork and the second fork has a fork axis in the bottom portion that intersects an axis of rotation of the front wheel, wherein the fork axis is spaced from and substantially parallel to the steering axis such that the front wheel has a second trail distance that is less than the first trail distance such that the steering of the three-wheel motorcycle is more responsive.

2. The method of claim 1 and further comprising:
   connecting the second fork to the three-wheel motorcycle with a same suspension as provided with the two-wheel motorcycle.

3. The method of claim 1, wherein the second fork has a single solid fork.

4. The method of claim 1, wherein when the front wheel is mounted to the first fork or the second fork, a contact point of the front wheel is directly vertically below the axis of rotation of the front wheel.

5. The method of claim 4, wherein the first and second trail distances are defined by a distance from the contact point of the front wheel to a point where the steering axis of the first and second forks intersect a ground level.

6. The method of claim 1, wherein when the second fork is installed a rake of the three-wheel motorcycle is substantially the same as a rake of the two-wheel motorcycle with the first fork.

7. A method of converting a two-wheel motorcycle to a three-wheel motorcycle, the method comprising:
   providing the two-wheel motorcycle;
   replacing a single rear drive wheel located along a midplane of the two-wheel motorcycle with two spaced apart drive wheels each located substantially a same distance from the midplane;
   removing a first fork configured to carry a front wheel from the motorcycle, wherein the first fork has a steering axis and wherein when the front wheel is mounted to the first fork, the front wheel has a first rake; and
   installing a second fork with a bottom portion and an angled top portion, wherein the steering axis remains substantially the same relative to the first fork and the second fork has a fork axis in the bottom portion that intersects an axis of rotation of the front wheel, wherein the fork axis is spaced from and substantially parallel to the steering axis such that the front wheel has a second rake that is substantially the same as the first rake.

8. The method of claim 7, wherein when the second fork is installed a trail distance is decreased relative to a trail distance of the first fork.

9. The method of claim 8, wherein decreasing the trail distance improves steering responsiveness to compensate for lack of steering by leaning for a two-wheel motorcycle.

10. The method of claim 7, wherein when the front wheel is mounted to the first fork or the second fork, a contact point of the front wheel is directly vertically below the axis of rotation of the front wheel.

11. The method of claim 10, wherein the first and second trail distances are defined by a distance from the contact point of the front wheel to a point where the steering axis of the first and second forks intersect a ground level.

12. A method of increasing steering responsiveness when converting a two-wheel motorcycle to a three-wheel motorcycle, the method comprising:
   removing a first fork configured to carry a front wheel from the motorcycle, wherein the first fork has a steering axis and wherein when the front wheel is mounted to the first fork, the front wheel has a first trail distance; and
   installing a second fork with a bottom portion and an angled top portion to the motorcycle, wherein the steering axis remains substantially the same relative to the first fork and the second fork has a fork axis in the bottom portion that intersects an axis of rotation of the front wheel, wherein the fork axis is spaced from and substantially parallel to the steering axis such that the front wheel has a second trail distance that is less than the first trail distance such that the steering of the three-wheel motorcycle is more responsive.

13. The method of claim 12 and further comprising:
   connecting the second fork to the three-wheel motorcycle with a same suspension as provided with the two-wheel motorcycle.

14. The method of claim 12, wherein the second fork has a single solid fork.

15. The method of claim 12, wherein when the front wheel is mounted to the first fork or the second fork, a contact point of the front wheel is directly vertically below the axis of rotation of the front wheel.

16. The method of claim 15, wherein the first and second trail distances are defined by a distance from the contact point of the front wheel to a point where the steering axis of the first and second forks intersect a ground level.

17. The method of claim 15, wherein when the second fork is installed a rake of the three-wheel motorcycle is substantially the same as a rake of the two-wheel motorcycle with the first fork.

* * * * *